(12) United States Patent
Schumacher et al.

(10) Patent No.: US 8,992,708 B2
(45) Date of Patent: Mar. 31, 2015

(54) USE OF SYNTHETIC ADHESIVES IN THE MANUFACTURE OF CORRUGATED FIBERBOARD

(75) Inventors: Karl-Heinz Schumacher, Neustadt (DE); Gledison Fonseca, Mannheim (DE); Rabie Al-Hellani, Ludwigshafen (DE); Wolfgang Gaschler, Niederwinkling (DE); Ellen Krüger, Otterstadt (DE); Andrea Herold, Weinheim (DE); Hildegard Stein, Mexico (MX); Oliver Hartz, Limburgerhof (DE); Hubertus Kröner, Neustadt (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/083,028

(22) Filed: Apr. 8, 2011

(65) Prior Publication Data
US 2011/0247746 A1 Oct. 13, 2011

Related U.S. Application Data

(60) Provisional application No. 61/322,317, filed on Apr. 9, 2010.

(51) Int. Cl.
| | | |
|---|---|---|
| *B31F 1/20* | (2006.01) | |
| *B31F 1/28* | (2006.01) | |
| *C08F 212/08* | (2006.01) | |
| *C09D 103/02* | (2006.01) | |
| *D21H 17/37* | (2006.01) | |
| *B29C 53/22* | (2006.01) | |
| *C08F 220/06* | (2006.01) | |
| *C08F 222/04* | (2006.01) | |
| *D21H 27/10* | (2006.01) | |
| *D21H 17/36* | (2006.01) | |

(52) U.S. Cl.
CPC ............. *B31F 1/2809* (2013.01); *C08F 212/08* (2013.01); *C09D 103/02* (2013.01); *D21H 17/37* (2013.01); *B29C 53/22* (2013.01); *C08F 220/06* (2013.01); *C08F 222/04* (2013.01); *D21H 27/10* (2013.01); *D21H 17/36* (2013.01)
USPC ............................ 156/205; 156/210; 156/325

(58) Field of Classification Search
CPC .......... B29C 53/22; B32B 3/28; B32B 29/08; B32B 2317/127; B31F 1/2809
USPC ......... 156/205, 206, 207, 208, 210, 290, 291, 156/292, 332, 325
See application file for complete search history.

(56) References Cited

U.S. PATENT DOCUMENTS 5,545,472 A * 8/1996 Koubek et al. ................ 442/385
6,080,813 A * 6/2000 Wendel et al. ................ 524/734

FOREIGN PATENT DOCUMENTS

| | | |
|---|---|---|
| CA | 1071085 | 2/1980 |
| DE | 1 594 231 | 10/1970 |
| DE | 2 243 687 | 3/1973 |
| DE | 2 347 145 | 4/1974 |
| DE | 30 42 850 A1 | 5/1981 |
| EP | 0 181 579 A2 | 5/1986 |
| EP | 0 536 597 A1 | 4/1993 |
| WO | WO 95/00596 A1 | 1/1995 |
| WO | WO 2006/086754 A2 | 8/2006 |
| WO | WO 2009/145642 A1 | 12/2009 |

OTHER PUBLICATIONS

International Search Report issued on Jul. 21, 2011 in corresponding International Application No. PCT/EP2011/055447 filed on Jul. 4, 2011 (with an English Translation of Category of Cited Documents).
U.S. Appl. No. 14/355,430, filed Apr. 30, 2014, Lawrenz, et al.
U.S. Appl. No. 14/375,937, filed Jul. 31, 2014, Al-Hellani, et al.

* cited by examiner

Primary Examiner — Philip Tucker
Assistant Examiner — John Blades
(74) Attorney, Agent, or Firm — Oblon, McClelland, Maier & Neustadt, L.L.P.

(57) ABSTRACT

Described is the use of synthetic adhesives in the manufacture of corrugated fiberboard at relatively low temperatures and high lineal speeds. The corrugated fiberboard includes a corrugated sheet of paper and a flat linerboard and the corrugation of the corrugated sheet of paper is produced at paper temperatures below 95° C. and at a lineal speed above 150 m/min. The production of the corrugation of a corrugated sheet of paper is immediately followed by a continuous operation in which a preferably unheated corrugated board adhesive is applied and the corrugated sheet of paper is adhered to at least one first linerboard. The corrugated board adhesive used is an aqueous adhesive dispersion based on at least one synthetic, dispersed polymer having preferably more than 40% by weight solids content, selected from acrylate copolymers, copolymers of vinylaromatics and conjugated aliphatic dienes and vinyl acetate-alkylene copolymers, wherein the glass transition temperatures of the polymers are above 20° C. and (preferably at least 5° C.) below the surface temperature of the corrugated sheet of paper to which they are applied.

16 Claims, No Drawings

USE OF SYNTHETIC ADHESIVES IN THE MANUFACTURE OF CORRUGATED FIBERBOARD

The present invention relates to the use of synthetic adhesives based on aqueous dispersions having a high solids content of certain, selected synthetic, dispersed copolymers in the manufacture of corrugated fiberboard at relatively low temperatures of below 95° C. and high lineal speeds of at least 150 m/min, and also to a corresponding process for manufacturing corrugated fiberboard.

Corrugated fiberboard is one of the most widely used forms of packaging in the world. It includes at least one corrugated sheet of paper, which is adhered to flat sheets of paper, the linerboards. Corrugated fiberboard frequently consists of three plies. Two outer, planar layers of paper and a corrugated ply adhered therebetween. There are also corrugated fiberboards having two or three corrugated plies and altogether 5 or, respectively, 7 layers. The manufacture of corrugated fiberboard is costly, inconvenient and associated with high raw-material and energy requirements. In the conventional manufacturing process, the raw paper is heated and hot steam is used to moisten it. This gives it the requisite elasticity and makes it formable. To form it into the corrugated pattern, the heated and moistened sheet of paper is corrugated between two heated fluted rolls under heat and pressure. Temperatures of 180° C. or higher are customary here. The still hot tips of the flutes are coated with a heated starch-based glue and adhered to the linerboard under light pressure. The starch-based glue is heated to temperatures above the gelatinization point of starch (60-64° C.). Frequently, the linerboard is also preheated in order that the requisite temperature above the gelatinization point of starch may be ensured for the duration of the adhering operation until the onset of sufficient adherence between the sheets of paper.

CA 1071085 describes a process for manufacturing corrugated fiberboard wherein heating the linerboard may be advantageous, but is not absolutely necessary. A vinyl acetate homopolymer is used in combination with a crosslinker. Although the adhesive formulation itself does not have to be heated, the corrugating is effected by heating with steam at a temperature of 149° C. (300° F.) and by using rolls heated to 99° C. (210° F.), and so the subsequent adhering takes place at elevated temperature.

DE 2347145 describes an adhesive composition for manufacturing corrugated fiberboard in the form of an aqueous dispersion comprising mineral particles and polymeric particles composed of styrene-butadiene copolymers. A piece of prefabricated corrugated paper has adhered to it, in a batch process, at room temperature, a liner paper during a setting time of 15 s. Such long setting times are unsuitable for continuous processes. Accordingly, the adhesive composition is called particularly useful for cases where a delay time has to be maintained between application of the adhesive composition and the pressing together of the layers coated with adhesive composition, for example in the manufacture of large bags or sacks of paper.

DE 2243687 describes an adhesive composition for manufacturing corrugated fiberboard in the form of an aqueous dispersion comprising certain, selected synthetic polymers in combination with certain, selected mineral particles. The problem underlying the invention of DE 2243687 was that of providing an adhesive composition which is produced and applied at minimally elevated temperatures, but is used on customary machines for manufacturing corrugated fiberboard. As the adhesive composition produced and applied at minimally elevated temperatures comes into contact with the corrugated sheet and the previously heated or warmed liner layer, the temperature of the adhesive composition also becomes elevated. To manufacture the corrugation, the corrugated paper was treated with steam and the fluted rolls are heated to about 180° C. for corrugation duty. DE 3042850 describes a so-called cold-hardening adhesive for the manufacture of corrugated fiberboard. The adhesive is applied at high temperatures and gels on cooling. The adhesive consists essentially of water-dissolved polyvinyl alcohol, a filler and a water-soluble boron compound. DE 1594231 describes a heat-activatable adhesive for manufacturing corrugated fiberboard. The adhesive comprises water-dissolved polyvinyl alcohol, suspended clay, a titanium oxalate complex and ammonium bicarbonate. EP 0181579 describes a process for manufacturing corrugated fiberboard wherein an adhesive composition is heated at 60 to 95° C. and is applied to the tips of the flutes of the sheet corrugated in a conventional manner, i.e., at high temperatures. The adhesive composition comprises polyvinyl alcohol in aqueous solution. WO 06/086754 describes an applicator for aqueous adhesive compositions in the manufacture of corrugated and laminated board whereby less adhesive than otherwise customary can be used. The substrate used for applying the adhesive is a corrugated fiberboard which already includes a corrugated sheet produced in a conventional manner, i.e., at high temperatures, and a first linerboard adhered thereto, and to which a second linerboard is adhered. The adhesive for adhering the second linerboard is heated to, for example, about 38° C. or 43° C. (100° F. or, respectively 110° F.) or applied to heated substrate.

It is an object of the present invention to provide an adhesive for an energy-efficient, economical manufacture of corrugated fiberboard whereby good adhering is made possible at comparatively low temperatures and high speeds and, more particularly, the selected composition of adhesive displays very rapid setting and also a very high initial tackiness at low temperatures. Moreover, the adhesive should impact the recyclability of the corrugated fiberboard only minimally, if at all.

The present invention accordingly provides for the use of synthetic adhesives in the manufacture of corrugated fiberboard wherein the corrugated fiberboard includes at least one corrugated sheet of paper and at least one flat linerboard and the corrugation of the corrugated sheet of paper is produced at paper temperatures below 95° C. and at a lineal speed of above 150 m/min, wherein in a continuous operation immediately after production of the corrugation of the corrugated sheet of paper a corrugated board adhesive, which is preferably unheated, is applied to the corrugated sheet of paper and the corrugated sheet of paper is adhered to at least one first linerboard;

wherein the corrugated board adhesive used is an aqueous adhesive dispersion having a solids content of preferably more than 40% by weight based on at least one synthetic, dispersed polymer selected from the group consisting of acrylate copolymers, copolymers of vinyl aromatics and conjugated aliphatic dienes and vinyl acetate-alkylene copolymers, wherein the synthetic, dispersed polymers have glass transition temperatures which are above 20° C. and below the surface temperature of the corrugated sheet of paper to which they are applied.

The corrugated board adhesive used is an aqueous adhesive dispersion based on at least one synthetic, dispersed polymer. The solids content is preferably more than 40% by weight and more preferably more than 50% by weight, for example in the range from 50% to 60% by weight. The pH of the adhesive dispersion is preferably set to above pH 3.7, more particularly to a pH between 4 and 8.

The glass transition temperature Tg of the dispersed polymers is above 20° C., preferably not less than 25° C., and is below the surface temperature of the corrugated sheet of paper, i.e., when the corrugation of the corrugated sheet of paper is produced at a temperature of less than 95° C., a polymer having a Tg of, for example, less than 95° C. is used. When the corrugation of the corrugated sheet of paper is produced at a temperature of less than 90° C., a polymer having a Tg of, for example, less than 90° C. is used, and so on. The glass transition temperature Tg of the polymer dispersed in the aqueous adhesive formulation is preferably less than 60° C. or less than 55° C. Preferably, the glass transition temperature is in the range from above +20° C. or not less than +25° C. to not more than +70° C. or not more than +60° C. or in the range from not less than +25° C. to not more than +55° C.

Glass transition temperature $T_g$ is to be understood as referring to the glass transition temperature limit to which the glass transition temperature tends with increasing molecular weight, according to G. Kanig (Kolloid-Zeitschrift & Zeitschrift für Polymere, vol. 190, page 1, equation 1). Glass transition temperature can be determined by Differential Scanning calorimetry (ASTM D 3418-08, "midpoint temperature"). By purposive variation of monomer type and quantity, a person skilled in the art is able according to the present invention to prepare aqueous polymeric compositions the polymers of which have a glass transition temperature in the desired range. Orientation is possible by means of the Fox equation. According to Fox (T. G. Fox, Bull. Am. Phys. Soc. 1956 [Ser. II] 1, page 123 and according to Ullmann's Encyclopädie der technischen Chemie, vol. 19, page 18, 4th edition, Verlag Chemie, Weinheim, 1980), the glass transition temperature of at most slightly crosslinked copolymers is given to a good approximation by:

$$1/T_g = x^1/T_g^1 + x^2/T_g^2 + \ldots x^n/T_g^n,$$

where $x^1, x^2, \ldots x^n$ are the mass fractions of the monomers 1, 2, ... n and $T_g^1, T_g^2, \ldots T_g^n$ are the glass transition temperatures in degrees kelvin of the polymers constructed of just one of the monomers 1, 2, ... n at a time. The $T_g$ values are known for the homopolymers of most monomers and listed for example in Ullmann's Ecyclopedia of Industrial Chemistry, vol. 5, Vol. A21, page 169, VCH Weinheim, 1992; further sources for glass transition temperatures of homopolymers are for example J. Brandrup, E. H. Immergut, Polymer Handbook, 1$^{st}$ Ed., J. Wiley, New York 1966, 2$^{nd}$ Ed. J. Wiley, New York 1975, and 3$^{rd}$ Ed. J. Wiley, New York 1989.

The minimum processing temperature of the corrugated board adhesive is preferably less than 80° C. or not more than 60° C. and is for example in the range from 5 to 60° C. The minimum processing temperature is that temperature at which the corrugated board adhesive is sufficiently fluid for application to the sheet of paper, more particularly, has a viscosity of less than 7000 mPa s or less than 5000 mPa s, for example in the range from 2000 to 5000 mPa s. The viscosity of the adhesive dispersion directly prior to application is preferably less than 7000 mPa s or less than 6000 mPa s, for example in the range from 2000 to 5000 mPa s. Viscosities can be measured in a Brookfield viscometer (RVT spindle 5, 10 revolutions per minute) at the application temperature (20° C. for example). The viscosity of the adhesive dispersion at 60° C. is preferably less than 7000 mPa s or less than 5000 mPa s, for example in the range from 2000 to 5000 mPa s. The viscosity of the adhesive dispersion at 20° C. is more preferably less than 7000 mPa s or less than 5000 mPa s, for example in the range from 2000 to 5000 mPa s.

The dispersed synthetic polymers used in the process of the present invention are selected from the group consisting of acrylate copolymers, copolymers of vinylaromatics and conjugated aliphatic dienes and vinyl acetate-alkylene copolymers. They are obtainable by free-radical polymerization of ethylenically unsaturated compounds (monomers).

Acrylate copolymers useful for the present invention are copolymers formed from at least two different (meth)acrylic esters. Hereinafter the notation "(meth)acrylic" is used as an abbreviation for "acrylic or methacrylic". The acrylate copolymers consist of (meth)acrylic esters, preferably $C_1$-$C_{20}$-alkyl (meth)acrylates, preferably to an extent of at least 60% by weight or to an extent of at least 80% by weight, more preferably to an extent of at least 90% by weight or to an extent of at least 95% by weight and up to 100% by weight. Suitable (meth)acrylate monomers are for example alkyl (meth)acrylates having a $C_1$-$C_{20}$-alkyl radical. Preference is given to $C_1$- to $C_{10}$-alkyl acrylates and $C_1$- to $C_{10}$-alkyl methacrylates, more particularly $C_1$- to $C_8$-alkyl acrylates and methacrylates. Very particular preference is given to methyl acrylate, methyl methacrylate, ethyl acrylate, n-butyl acrylate, n-hexyl acrylate, octyl acrylate, 2-ethylhexyl acrylate and 2-propylheptyl acrylate and also mixtures thereof. More particularly, mixtures of three or more alkyl (meth)acrylates are suitable.

In addition to the principal monomers, the polymers to be used according to the present invention may comprise further monomers, for example monomers having carboxylic acid, sulfonic acid or phosphonic acid groups. Carboxylic acid groups are preferred. Acrylic acid, methacrylic acid, itaconic acid, maleic acid or fumaric acid may be mentioned by way of example. The acid monomer content of the polymer can be for example in the range from 0 to 10% by weight and more particularly in the range from 0.05% to 5% by weight, based on the polymer. The acid groups can be present in the form of their salts. Further monomers also include for example hydroxyl-containing monomers, more particularly $C_1$-$C_{10}$ hydroxyalkyl (meth)acrylates or (meth)acrylamide. Useful further monomers further include phenyloxyethyl glycol mono(meth)acrylate, glycidyl (meth)acrylate, aminoalkyl (meth)acrylates such as, for example, 2-aminoethyl (meth) acrylate. Alkyl groups preferably have from 1 to 20 carbon atoms. Crosslinking monomers may also be mentioned as further monomers. The further monomers are generally used in minor amounts, their proportion in total being preferably below 10% by weight, more particularly below 5% by weight.

In one embodiment, the dispersed polymer of the adhesive formulation is a vinyl acetate-alkylene copolymer. Vinyl acetate-alkylene copolymers are copolymers formed from vinyl acetate and at least one alkylene, preferably at least one $C_2$- to $C_8$-alkylene such as, for example, ethylene and/or propylene.

Copolymers formed from vinylaromatics and conjugated aliphatic dienes are for example copolymers formed from
 (a) 19.9 to 80 parts by weight of at least one vinylaromatic compound,
 (b) 19.9 to 80 parts by weight of at least one conjugated aliphatic diene,
 (c) 0.1 to 15 parts by weight of at least one ethylenically unsaturated acid, and
 (d) 0 to 20 parts by weight of at least one other monoethylenically unsaturated monomer.

Vinylaromatic compounds are, for example, styrene, α-methylstyrene and/or vinyltoluene. Of this group of monomers, styrene is preferred. 100 parts by weight of the total monomer mixtures used in the polymerization comprise for example from 19.9 to 80 parts by weight and preferably from 25 to 70 parts by weight of at least one vinylaromatic.

Conjugated aliphatic dienes are for example 1,3-butadiene, isoprene, 1,3-pentadiene, 1,3-dimethylbutadiene and cyclopentadiene. Of this group of monomers, it is 1,3-butadiene and/or isoprene which are preferably used. 100 parts by weight of the monomer mixtures used in total in the emulsion polymerization comprise for example from 19.9 to 80 parts by weight, preferably from 25 to 70 parts by weight and more particularly from 25 to 60 parts by weight of at least one conjugated aliphatic diene.

Ethylenically unsaturated acids are for example ethylenically unsaturated carboxylic acids, ethylenically unsaturated sulfonic acids and vinylphosphonic acid. As ethylenically unsaturated carboxylic acids it is preferable to use alpha, beta-monoethylenically unsaturated mono- and dicarboxylic acids having from 3 to 6 carbon atoms in the molecule. Examples thereof are acrylic acid, methacrylic acid, maleic acid, fumaric acid, crotonic acid, vinylacetic acid and vinyllactic acid. Examples of useful ethylenically unsaturated sulfonic acids are vinylsulfonic acid, styrenesulfonic acid, acrylamidomethylpropanesulfonic acid, sulfopropyl acrylate and sulfopropyl methacrylate. Monomers comprising acid groups can be used in the polymerization in the form of the free acids and also partially or completely neutralized with alkali metal hydroxide solutions or with ammonia or with an ammonium base. Preference is given to using aqueous sodium hydroxide solution, aqueous potassium hydroxide solution or ammonia as neutralizing agent. 100 parts by weight of the monomer mixtures used in the emulsion polymerization comprise for example from 0.1 to 15 parts by weight, preferably 0.1 to 8 parts by weight and usually from 1 to 5 parts by weight of at least one ethylenically unsaturated acid monomer.

Other monoethylenically unsaturated monomers are for example ethylenically unsaturated carbonitriles such as, more particularly, acrylonitrile and methacrylonitrile, ethylenically unsaturated carboxamides such as, more particularly, acrylamide and methacrylamide, vinyl esters of saturated $C_1$- to $C_{18}$ carboxylic acids, preferably vinyl acetate, and also esters of acrylic acid and of methacrylic acid with monohydric $C_1$- to $C_{18}$ alcohols such as methyl acrylate, methyl methacrylate, ethyl acrylate, ethyl methacrylate, n-propyl acrylate, n-propyl methacrylate, isopropyl acrylate, isopropyl methacrylate, n-butyl acrylate, n-butyl methacrylate, isobutyl acrylate, isobutyl methacrylate, sec-butyl acrylate, sec-butyl methacrylate, tert-butyl acrylate, tert-butyl methacrylate, pentyl acrylates, pentyl methacrylates, 2-ethylhexyl acrylate, 2-ethylhexyl methacrylate, allyl esters of saturated carboxylic acids, vinyl ethers, vinyl ketones, dialkyl esters of ethylenically unsaturated carboxylic acids, N-vinylpyrrolidone, N-vinylpyrrolidine, N-vinylformamide, N,N-dialkylaminoalkylacrylamides, N,N-dialkylaminoalkylmethacrylamides, N,N-dialkylaminoalkyl acrylates, N,N-dialkylaminoalkyl methacrylates, vinyl chloride and vinylidene chloride. This group of monomers is optionally used for modifying the polymers. 100 parts by weight of the monomer mixtures used in the emulsion polymerization comprise for example from 0 to 20 parts by weight or from 0.1 to 15 parts by weight and more particularly from 0.1 to 10 parts by weight of at least one other monoethylenically unsaturated monomer.

It is particularly preferable for the synthetic, dispersed polymers to be selected from the group consisting of acrylate copolymers of at least two different $C_1$- to $C_8$-alkyl (meth) acrylates, styrene-butadiene copolymers and vinyl acetate-ethylene copolymers.

The polymers may be prepared by emulsion polymerization. To achieve particularly high solids contents, for example of more than 55% by weight, a bi- or polymodal particle size should be aimed for, since otherwise the viscosity becomes too high and the dispersion is more difficult to handle. The production of a new generation of particles can be effected for example by adding seed, by adding excess quantities of emulsifier or by adding miniemulsions. A further advantage associated with low viscosity at high solids content is the improved coating behavior at high solids contents.

In a further embodiment, the adhesive dispersion comprises an aqueous polymeric dispersion of polymers obtainable by free-radical polymerization of unsaturated monomers (especially the ones mentioned above) and comprising in added form at least one starch degradation product obtainable by hydrolysis in aqueous phase. The starch degradation product preferably has a weight average molecular weight Mw in the range from 2500 to 25 000. Such polymeric dispersions are described in EP 0 536 597.

In a further embodiment, the adhesive dispersion comprises an aqueous polymeric dispersion based on copolymers formed from vinylaromatics and conjugated aliphatic dienes wherein the dispersed particles have an average particle size in the range from 80 to 150 nm and are obtainable by free-radically initiated emulsion copolymerization of
(a) 19.9 to 80 parts by weight of at least one vinylaromatic compound,
(b) 19.9 to 80 parts by weight of at least one conjugated aliphatic diene,
(c) 0.1 to 15 parts by weight of at least one ethylenically unsaturated acid, and
(d) 0 to 20 parts by weight of at least one other monoethylenically unsaturated monomer,
wherein the sum total of the parts by weight of the monomers (a), (b), (c) and (d) is always 100, in an aqueous medium in the presence of at least one degraded starch having an intrinsic viscosity $\eta_i$ of less than 0.07 dl/g using at least 0.9% by weight, based on total monomers used, of initiators selected from peroxodisulfates, peroxosulfates, azo initiators, organic peroxides, organic hydroperoxides and hydrogen peroxide, by initially charging at least 30% by weight of the initiators together with the degraded starch in the aqueous medium and metering the monomers and the rest of the initiators into this initial charge under polymerization conditions.

In another embodiment of the adhesive dispersion, starches are present in addition to the dispersed synthetic polymers, preferably degraded starches and specifically amylopectin starch types, for example Amflora® starch. The starch can be mixed into the final dispersion or else be used as a protective colloid in the making of the dispersion.

The size distribution of the dispersion particles in the adhesive dispersion can be monomodal, bimodal or multimodal. In the case of a monomodal particle size distribution, the average particle size of the polymer particles dispersed in the aqueous dispersion is preferably less than 400 nm and more particularly less than 250 nm. It is particularly preferable for the average particle size to be between 140 and 250 nm. Average particle size here is understood as meaning the $d_{50}$ value of the particle size distribution, i.e., 50% by weight of the total mass of all the particles have a smaller particle diameter than the $d_{50}$ value. The particle size distribution can be determined in a known manner using an analytical ultracentrifuge (W. Mächtle, Makromolekulare Chemie 185 (1984), page 1025-1039). In the case of a bi- or multimodal particle size distribution, the particle size can be up to 1000 nm.

The adhesive dispersion can consist exclusively of the dispersed polymer and the optional starch. However, the adhesive dispersion may also additionally comprise further added substances, for example flow control agents, thickeners, preferably associative thickeners, defoamers, wetters or tackifiers. Tackifiers are tackifying resins and known for example from Adhesive Age, July 1987, pages 19-23 or Polym. Mater. Sci. Eng. 61 (1989), pages 588-592. To improve its wetting of surfaces, the adhesive dispersion may comprise particularly wetting assistants, for example fatty alcohol ethoxylates, alkylphenol ethoxylates, nonylphenol ethoxylates, polyoxyethylene/polyoxypropylenes or sodium dodecylsulfonates. The amount of added substances is generally in the range from 0.05 to 5 parts by weight and more particularly in the range from 0.1 to 3 parts by weight per 100 parts by weight of polymer (solid). Tackifiers are for example natural resins, such as rosins and their disproportionation or isomerization, polymerization, dimerization, hydrogenation derivatives. These can be present in their salt form (with, for example, mono- or polyvalent counterions (cations)) or preferably in their esterified form. Alcohols used for esterification can be mono- or polyhydric. Examples are methanol, ethanediol, diethylene glycol, triethylene glycol, 1,2,3-propanethiol, pentaerythritol. It is further possible to use hydrocarbon resins, for example coumarone-indene resins, polyterpene resins, hydrocarbon resins based on unsaturated CH compounds, such as butadiene, pentene, methylbutene, isoprene, piperylene, divinylmethane, pentadiene, cyclopentene, cyclopentadiene, cyclo-hexadiene, styrene, α-methylstyrene, vinyltoluene. Tackifiers used increasingly also include polyacrylates having a low molecular weight. The weight average molecular weight $M_w$ of these polyacrylates is preferably below 30 000. The polyacrylates preferably consist of $C_1$-$C_8$ alkyl (meth)acrylates to an extent of at least 60% by weight and more particularly at least 80% by weight. Preferred tackifiers are natural or chemically modified rosins. Rosins consist predominantly of abietic acid or abietic acid derivatives. Tackifiers can simply be added to the polymeric dispersion. For this, the tackifiers themselves are preferably present in the form of an aqueous dispersion. The weight quantity of the tackifiers is preferably in the range from 5 to 100 parts by weight and more preferably in the range from 10 to 50 parts by weight, based on 100 parts by weight of polymer (solid/solid).

In one embodiment, adhesive dispersion further comprises inorganic fillers. The level of inorganic fillers is preferably in the range from 1% to 90% by weight and more preferably in the range from 5% to 80% by weight, or from 20% to 80% by weight or from 40% to 70% by weight, based on the solids content.

Suitable fillers are for example calcium carbonate and also calcium sulfate, calcium aluminate sulfate, barium sulfate, magnesium carbonate, of which carbonate pigments and more particularly calcium carbonate are preferred. The calcium carbonate may be natural ground calcium carbonate (GCC), precipitated calcium carbonate (PCC), lime or chalk. Suitable calcium carbonate pigments are available for example as Covercarb® 60, Hydrocarb® 60 or Hydrocarb® 90 ME. Suitable fillers further include, for example, silicas, aluminas, aluminum hydrate, silciates, titanium dioxide, zinc oxide, kaolin, argillaceous earth, talcum or silicon dioxide. Suitable fillers are for example available as Capim® MP 50 (clay), Hydragloss® 90 (clay), Amazon Plus Slurry (kaolin) or Talcum C10.

Corrugated fiberboard is produced by means of a corrugating operation. Corrugating is effected by passing an uncorrugated sheet of paper as corrugatable medium through a corrugator wherein one or more suitably shaped rolls (two fluted rolls for example) endow the medium with a corrugated profile. To achieve optimal corrugation, the corrugatable material can be pretreated with steam or heated/warmed by means of other media. However, a maximum temperature of 95° C. and preferably of 90° C. is not exceeded in the process. The temperatures used in the corrugating operation are preferably in the range from 40 to 90° C. and more preferably in the range from 40 to 60° C. The paper is heated to improve its formability for corrugation. The adhesive itself need not necessarily be heated since it can even be filmed without heating in one preferred embodiment. For superior filming of the adhesive, however, the step of coating the corrugated fiberboard with the adhesive can optionally be followed by heating with a source of radiation such as IR radiators for example, or the sheet of paper can be diverted via a heated roll.

Corrugation and the directly subsequent adhering to the first linerboard takes place in a continuous operation. The lineal speed of the sheets of paper is preferably more than 150 m/min, particularly more than 200 m/min, more than 250 m/min or more than 300 m/min.

Immediately thereafter, the tips of the flutes of the corrugated medium have corrugated board adhesive applied to them and a flat sheet of paper is applied as a linerboard (liner paper) under light pressure to that side of the medium which bears the adhesive in order that a one-face corrugated fiberboard may be produced. Subsequently, additional adhesive can be applied to the unadhered side of the corrugated sheet of paper to adhere a further linerboard, leading to the production of single-wall standard corrugated fiberboard. Multi-wall corrugated fiberboards are obtainable by bonding a succession of one-face boards to each other, followed by a final application of a linerboard.

The adhesive can be applied in a conventional manner using a system of rolls of which one roll bears a film of adhesive. As the corrugated material revolves around this roll, the film of adhesive becomes applied to the ribbed side (tips of the flutes) of the corrugated material. The adhesive, however, can also be applied by means of other suitable devices, for example with nozzles, slotted dies or similar.

The amount of adhesive applied is preferably in the range from 2 to 15 g/m² and more particularly in the range from 3 to 7 g/m², based on the solids content and the total area of the corrugated material. The tips of the corrugated material may have 15 to 25 g/m² applied to them, for example, depending on the geometry.

The corrugated board adhesive need not be warmed prior to application. It is accordingly preferable to apply unheated corrugated board adhesive to the corrugated sheet of paper, i.e., the adhesive is not heated by a separate source of heat prior to application, and has a temperature of preferably not more than 25° C. Optionally, however, slight heating of the adhesive to temperatures of, for example, more than 25° C. to 50° C. or to 40° C. is also possible.

The present invention also provides a process for manufacturing corrugated fiberboard wherein the corrugated fiberboard includes at least one corrugated sheet of paper and at least one flat linerboard and the corrugation of the corrugated sheet of paper is produced at paper temperatures below 95° C. and at a lineal speed of above 150 m/min wherein in a continuous operation immediately after production of the corrugation of the corrugated sheet of paper a preferably unheated corrugated board adhesive is applied to the corrugated sheet of paper and the corrugated sheet of paper is adhered to at least one first linerboard;

wherein the corrugated board adhesive used is one of the aqueous adhesive dispersions described in more detail above.

The adhesive used according to the present invention allows good recyclability on the part of the corrugated fiberboard. For recyclability to be good a rating of 4 or better is required in the test described in the examples. In this test, a corrugated paper is coated with the adhesive of the present invention and laminated with a liner paper. The laminate obtained is dried and fiberized in a repulper. Subsequently, the pulp thus produced is used to produce a sheet of paper and this sheet of paper is visually inspected for specks and visible contraries.

It has been determined that particularly good recyclability can be achieved when in addition to the glass transition temperature being in the claimed range the synthetic, dispersed polymers are constructed to at least 3% by weight, preferably from 4% to 15% by weight, based on the sum of all monomers, of hydrophilic comonomers. Hydrophilic comonomers are monomers having hydrophilic groups. Hydrophilic groups are for example acid groups and also amino groups, ammonium groups, hydroxyl groups or polyethylene oxide groups having at least two ethylene oxide units. Hydrophilic monomers are for example ethylenically unsaturated acid monomers, ethylenically unsaturated amine monomers and ethylenically unsaturated monomers having polyethylene oxide groups, of which ethylenically unsaturated acid monomers are preferred.

Ethylenically unsaturated acid monomers are for example ethylenically unsaturated carboxylic acids, ethylenically unsaturated sulfonic acids and vinylphosphonic acid. As ethylenically unsaturated carboxylic acids it is preferable to use alpha,beta-monoethylenically unsaturated mono- and dicarboxylic acids having from 3 to 6 carbon atoms in the molecule. Examples thereof are acrylic acid, methacrylic acid, itaconic acid, maleic acid, fumaric acid, crotonic acid, vinylacetic acid and vinyllactic acid. Examples of useful ethylenically unsaturated sulfonic acids are vinylsulfonic acid, styrenesulfonic acid, acrylamidomethylpropanesulfonic acid, sulfopropyl acrylate and sulfopropyl methacrylate. Monomers comprising acid groups can be used in the polymerization in the form of the free acids and also partially or completely neutralized with alkali metal hydroxide solutions or with ammonia or with an ammonium base. Preference is given to using aqueous sodium hydroxide solution, aqueous potassium hydroxide solution or ammonia as neutralizing agent. Acrylic acid, methacrylic acid and itaconic acid are particularly preferred.

Amine monomers are for example aminoalkyl (meth)acrylates such as, for example, 2-aminoethyl (meth)acrylate, monoalkylaminoalkyl (meth)acrylates, dialkylaminoalkyl (meth)acrylates, aminoalkyl(meth)acrylamides, monoalkylaminoalkyl(meth)acrylamides and dialkylaminoalkyl(meth)acrylamides. Alkyl groups preferably have from 1 to 20 carbon atoms. The amino-containing monomers can be present in the form of the free amino groups and also after partial or complete conversion, with acids or quaternizing agents, into ammonium groups.

Hydrophilic comonomers having hydroxyl groups are, for example, $C_2$-$C_8$ hydroxyalkyl esters of acrylic acid or of methacrylic acid.

Hydrophilic comonomers having polyethylene glycol groups are for example those of the general formula

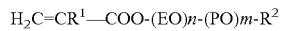

$$H_2C=CR^1\text{---}COO\text{-}(EO)n\text{-}(PO)m\text{-}R^2$$

where $R^1$ is hydrogen or methyl, n is at least two, preferably from 6 to 100 or from 10 to 40, m is from zero to 50, preferably from zero to 20, EO is an ethylene oxide group (—$CH_2$—$CH_2$—O—), PO is a propylene oxide group (—$CH_2$—$CH(CH_3)$—O—) and $R^2$ is hydrogen or a $C_1$-$C_{30}$ alkyl group or a $C_1$-$C_{30}$ alkaryl group, wherein n is preferably not less than m and n+m is preferably from 6 to 100 or from 10 to 40.

The corrugated board adhesives used according to the present invention and/or the process of the present invention have the following advantages over existing processes:

The adhesives provide for a more energy-efficient, economical manufacture of corrugated fiberboard than conventional starch-based adhesives. The adhesives of the present invention provide good adhering at comparatively low temperatures and high lineal speeds, with particularly the selected compositions of adhesive providing very rapid setting and also a very high initial tack at low temperatures. The adhesive does not impair the recyclability of the corrugated fiberboard.

EXAMPLES

Unless the context suggests otherwise, percentages are always by weight. A reported content is based on the content in aqueous solution or dispersion.

Inventive Example 1

Copolymer formed from 39.5 parts by weight of n-butyl acrylate, 56.5 parts by weight of styrene, 4 parts by weight of methacrylic acid, emulsion polymerized in water in the presence of 0.1 part by weight of tert-dodecyl mercaptan, 1.2 parts by weight of Disponil® FES 27 emulsifier, 0.25 part by weight of Dowfax 2A1 emulsifier, 0.6 part by weight of sodium persulfate (initiator).

Solids content: 49%, pH 6.2, Tg +41° C.

Inventive Example 2

Copolymer formed from 43 parts by weight of n-butyl acrylate, 52 parts by weight of styrene, 5 parts by weight of acrylic acid, emulsion polymerized in water in the presence of 0.5 part by weight of tert-dodecyl mercaptan, 0.9 part by weight of Disponil® FES 27 emulsifier, 0.6 part by weight of sodium persulfate (initiator).

Solids content: 54%, pH 4.0, Tg +31° C.

Inventive Example 3

Copolymer formed from 38 parts by weight of n-butyl acrylate, 55 parts by weight of styrene, 5 parts by weight of vinyl acetates, 2 parts by weight of acrylic acid, emulsion polymerized in water in the presence of 0.1 part by weight of tert-dodecyl mercaptan, 1.2 parts by weight of Disponil® FES 27 emulsifier, 0.25 part by weight of Dowfax 2A1 emulsifier, 0.6 part by weight of sodium persulfate (initiator).

Solids content: 49%. pH 4.0. Tg +35° C.

Inventive Example 4

Copolymer formed from 42 parts by weight of n-butyl acrylate, 48 parts by weight of styrene, 5 parts by weight of vinyl acetate, 5 parts by weight of acrylic acid, emulsion polymerized in water in the presence of 0.5 part by weight of tert-dodecyl mercaptan, 0.9 part by weight of Disponil® FES 27, 0.6 parts by weight of sodium persulfate.

Solids content: 52%, pH 4.0, Tg +28° C.

Inventive Example 5

Copolymer formed from 36 parts by weight of n-butyl acrylate, 62 parts by weight of styrene, 2 parts by weight of acrylic acid, emulsion polymerized in water in the presence of 0.1 part by weight of tert-dodecyl mercaptan, 1.2 parts by weight of Disponil® FES 27 emulsifier, 0.25 part by weight of Dowfax 2A1 emulsifier, 0.6 part by weight of sodium persulfate (initiator).
Solids content: 49%, pH 4.1, Tg +43° C.

Inventive Example 6

Copolymer formed from 33 parts by weight of 2-propylheptyl acrylate, 62 parts by weight of styrene, 5 parts by weight of acrylic acid, emulsion polymerized in water in the presence of 0.5 part by weight of tert-dodecyl mercaptan, 0.9 part by weight of Disponil® FES 27, 0.6 part by weight of sodium persulfate.
Solids content: 54%, pH 4.7, Tg +37° C.

Inventive Example 7

Copolymer formed from 49.5 parts by weight of n-butyl acrylate, 48.5 parts by weight of styrene, 2 parts by weight of acrylic acid, emulsion polymerized in water in the presence of 0.1 part by weight of tert-dodecyl mercaptan, 1.2 parts by weight of Disponil® FES 27 emulsifier, 0.25 part by weight of Dowfax 2A1 emulsifier, 0.6 part by weight of sodium persulfate (initiator).
Solids content: 49%, pH 4.0, Tg +44° C.

Inventive Example 8

Copolymer formed from 60.5 parts by weight of styrene, 28.0 parts by weight of butadiene, 11 parts by weight of acrylic acid; 0.5 part by weight of itaconic acid; emulsion polymerized in water in the presence of 1.1 parts by weight of tert-dodecyl mercaptan, 0.5 part by weight of Disponil® FES 27, 0.9 part by weight of sodium persulfate.
Solids content: 52%, pH 5.4, Tg +38.2° C.

Inventive Example 9

Copolymer formed from 56.5 parts by weight of styrene, 32 parts by weight of butadiene, 11 parts by weight of acrylic acid, 0.5 part by weight of itaconic acid, emulsion polymerized in water in the presence of 1.1 parts by weight of tert-dodecyl mercaptan, 0.5 part by weight of Disponil® FES 27, 0.9 part by weight of sodium persulfate.
Solids content: 50%, pH 5.5, Tg +30° C.

Inventive Example 10

Copolymer formed from 56.5 parts by weight of styrene, 32.0 parts by weight of butadiene, 11 parts by weight of acrylic acid; 0.5 part by weight of itaconic acid, emulsion polymerized in water in the presence of 1.1 parts by weight of tert-dodecyl mercaptan, 0.5 part by weight of Lumiten I-SC, 0.9 part by weight of sodium persulfate.
Solids content: 52%, pH 5.6, Tg +26.3° C.

Inventive Example 11

Copolymer formed from 65.5 parts by weight of styrene, 23 parts by weight of butadiene, 11 parts by weight of acrylic acid; 0.5 part by weight of itaconic acid; emulsion polymerized in water in the presence of 1.1 parts by weight of tert-dodecyl mercaptan, 0.5 part by weight of Disponil® FES 27, 0.9 part by weight of sodium persulfate.
Solids content: 49%, pH 5.3, Tg +53° C.

Inventive Example 12

The copolymer dispersion of inventive example 2 was admixed with Precarb 100 calcium carbonate in a ratio of 77:23 (solid/solid) for the same total solids content, i.e., some of the polymer was replaced by calcium carbonate.
Solids content: 54%, pH 6.5

Comparative Example V1

Copolymer formed from 52 parts by weight of n-butyl acrylate, 38 parts by weight of styrene, 10 parts by weight of acrylic acid, emulsion polymerized in water in the presence of 0.5 part by weight of tert-dodecyl mercaptan, 1.2 parts by weight of Disponil® FES 27, 0.25 part by weight of Dowfax® 2 A1, 0.6 part by weight of sodium persulfate.
Solids content: 49%, pH 3.5, Tg +17° C.

Comparative Example V2

Copolymer formed from 41 parts by weight of ethyl acrylate, 57 parts by weight of styrene, 2 parts by weight of acrylic acid, emulsion polymerized in water in the presence of 0.1 part by weight of tert-dodecyl mercaptan, 1.2 parts by weight of Disponil® FES 27, 0.25 part by weight of Dowfax® 2 A1, 0.6 part by weight of sodium persulfate.
Solids content: 49%, pH 4.6, Tg +57° C.

Comparative Example V3

Copolymer formed from 64.5 parts by weight of styrene, 35 parts by weight of butadiene, 0.5 part by weight of itaconic acid; emulsion polymerized in water in the presence of 1.1 parts by weight of tert-dodecyl mercaptan, 0.5 part by weight of Disponil® FES 27, 0.9 part by weight of sodium persulfate.
Solids content: 51%, pH 11.6, Tg +10° C.

Performance Tests

Wet Grab:
To evaluate wet grab, a corrugated paper having a basis weight of 105 g/m² is blade coated at 55° C. with an approximately 1 mm layer of adhesive. Almost at the same time as the coating, a liner paper (test liner 3) is laminated onto the wet adhesive. Directly after wet lamination, a stopwatch is started and the bonded assembly is slowly pulled apart. What is measured is the time to a significant fiber pullout becoming visible. The shorter the time to fiber pullout, the better the wet grab. At a value of less than 10 s, it can be assumed that the wet-bonded assembly is sufficiently firm on a production scale machine even at a production speed of more than 300 m/min not to come apart in the machine at a change of direction roll for example.

Recyclability:
A corrugated paper having a basis weight of 105 g/m² is coated with 5 g/m² (20 μm doctor blade) of the adhesive to be tested and wet laminated with a test liner 3. After the laminate thus produced has dried at 90° C. for 5 min, the laminate is fiberized in a repulper for 30 min. Subsequently, the pulp thus produced is used to produce a sheet of paper and this sheet of paper is visually inspected for specks and visible contraries. On a scale from 1 to 10, a weighting of 1 means "no visible specks/no visible contraries" and a weighting of 10 means "very many visible specks/very many contraries". When rated 4 or better, such a material is believed to be readily recyclable in the customary recycling operations.

| Example | Acid content of polymer | Tg of polymer | Wet grab | Recycling test |
|---------|------------------------|---------------|----------|----------------|
| 1  | 4    wt % | 41° C. | 6 s   | 2 |
| 2  | 5    wt % | 31° C. | 4 s   | 3 |
| 3  | 2    wt % | 35° C. | 4 s   | 2 |
| 4  | 5    wt % | 28° C. | 4 s   | 3 |
| 5  | 2    wt % | 43° C. | 7 s   | 2 |
| 6  | 5    wt % | 37° C. | 4 s   | 2 |
| 7  | 2    wt % | 44° C. | 5 s   | 2 |
| 8  | 11   wt % | 38° C. | 4 s   | 2 |
| 9  | 11.5 wt % | 30° C. | 5 s   | 2 |
| 10 | 11   wt % | 26° C. | 4 s   | 2 |
| 11 | 11.5 wt % | 53° C. | 4 s   | 2 |
| 12 | 5    wt % | 31° C. | 4 s   | 3 |
| V1 | 10   wt % | 17° C. | 6 s   | 9 |
| V2 | 2    wt % | 57° C. | >60 s | 2 |
| V3 | 0.5  wt % | 10° C. | 3 s   | 9 |

We claim:

1. A method of manufacturing a corrugated fiberboard wherein the corrugated fiberboard includes at least one corrugated sheet of paper and at least one flat linerboard, said method comprising
    corrugating a sheet of paper at paper temperatures below 95° C. and at a lineal speed of above 150 m/min;
    applying a corrugated board adhesive to the corrugated sheet of paper in a continuous operation immediately after production of the corrugation of the corrugated sheet of paper, and adhering the corrugated sheet of paper to at least one first linerboard,
    wherein:
    the corrugated board adhesive is an aqueous adhesive dispersion consisting of at least one synthetic, dispersed polymer, and optionally at least one additional component selected from the group consisting of starch, a flow control agent, a thickener, a defoamer, a wetter, a tackifier, and an inorganic filler,
    each synthetic, dispersed polymer comprises 19.9 to 80 parts by weight of at least one of a vinyl aromatic monomer and a conjugated aliphatic diene, 0.1 to 15 parts by weight of an acrylate monomer, and 0.1 to 15 parts by weight of ethylenically unsaturated acid, each monomer unit present in amounts relative to 100 parts by weight of the monomers present in each synthetic, dispersed polymer,
    each synthetic, dispersed polymer is obtained by emulsion polymerization in at least the presence of water and an emulsifier,
    the synthetic, dispersed polymer has a glass transition temperature above 25° C. and below the surface temperature of the corrugated sheet of paper to which they are applied, and
    the aqueous adhesive dispersion has a pH of from 4.0 to 5.6.

2. The method of claim 1, wherein the aqueous adhesive dispersion has a viscosity of from 2,000 to 7,000 mPa·s.

3. The method of claim 1, wherein the ethylenically unsaturated acid is at least one member selected from the group consisting of acrylic acid, methacrylic acid, and itaconic acid.

4. The method of claim 1, wherein each synthetic, dispersed polymer has a glass transition temperature of below 60° C.

5. The method of claim 1, wherein the minimum processing temperature of the adhesive dispersion is below 80° C.

6. The method of claim 1, wherein the adhesive dispersion further comprises, in added form, at least one starch degradation product obtainable by hydrolysis in aqueous phase.

7. The method of claim 1, wherein the aqueous polymer dispersion further comprises inorganic filler in an amount of from 5% to 80% by weight, based on a solids content of the aqueous polymer dispersion.

8. The method of claim 1, wherein the lineal speed is at least 200 m/min.

9. The method of claim 1, wherein the adhesive allows recycling of the corrugated fiberboard.

10. The method of claim 1, wherein the corrugated board adhesive used comprises an aqueous adhesive dispersion having a solids content of more than 40% by weight.

11. The method of claim 1, wherein the corrugated board adhesive comprises an inorganic filler in an amount of 1% to 90% by weight, based on the solids content.

12. The method of claim 1, wherein the dispersed polymer has a glass transition temperature of below 55° C.

13. The method of claim 1, wherein the minimum processing temperature of the adhesive dispersion is from 5 to 60° C.

14. The method of claim 1, wherein the additional components are present in the adhesive dispersion in the range of from 0.05 to 5 parts by weight of the dispersed solid polymer.

15. A method of manufacturing a corrugated fiberboard wherein the corrugated fiberboard includes at least one corrugated sheet of paper and at least one flat linerboard, said method comprising
    corrugating a sheet of paper at paper temperatures below 95° C. and at a lineal speed of above 150 m/min;
    applying a corrugated board adhesive to the corrugated sheet of paper in a continuous operation immediately after production of the corrugation of the corrugated sheet of paper, and adhering the corrugated sheet of paper to at least one first linerboard;
    wherein:
    the corrugated board adhesive is an aqueous adhesive dispersion consisting of at least one synthetic, dispersed polymer, starch and optionally at least one additional component selected from the group consisting of a flow control agent, a thickener, a defoamer, a wetter, and a tackifier,
    each synthetic, dispersed polymer comprises 19.9 to 80 parts by weight of at least one of a vinyl aromatic monomer and a conjugated aliphatic diene, 0.1 to 15 parts by weight of an acrylate monomer, and 0.1 to 15 parts by weight of ethylenically unsaturated acid, each monomer unit present in amounts relative to 100 parts by weight of the monomers present in each synthetic, dispersed polymer,
    each synthetic, dispersed polymer is obtained by emulsion polymerization in at least the presence of water and an emulsifier,
    the synthetic, dispersed polymer has a glass transition temperature above 25° C. and below the surface temperature of the corrugated sheet of paper to which they are applied, and
    the aqueous adhesive dispersion has a pH of from 4.0 to 5.6.

16. A method of manufacturing a corrugated fiberboard wherein the corrugated fiberboard comprises at least one corrugated sheet of paper and at least one flat linerboard, said method comprising
    corrugating a sheet of paper at paper temperatures below 95° C. and at a lineal speed of above 150 m/min;

applying a corrugated board adhesive to the corrugated sheet of paper in a continuous operation immediately after production of the corrugation of the corrugated sheet of paper, and adhering the corrugated sheet of paper to at least one first linerboard, wherein the corrugated board adhesive is an aqueous adhesive dispersion-consisting of at least one synthetic, dispersed polymer and starch, wherein the at least one each synthetic, dispersed polymer comprises 19.9 to 80 parts by weight of at least one of a vinyl aromatic monomer and a conjugated aliphatic diene, 0.1 to 15 parts by weight of an acrylate monomer, and 0.1 to 15 parts by weight of ethylenically unsaturated acid, each monomer unit present in amounts relative to 100 parts by weight of the monomers present in each synthetic, dispersed polymer, each synthetic, dispersed polymer is obtained by emulsion polymerization in at least the presence of water and an emulsifier, the synthetic, dispersed polymer has a glass transition temperature above 25° C. and below the surface temperature of the corrugated sheet of paper to which they are applied, and the aqueous adhesive dispersion has a pH of from 4.0 to 5.6.

* * * * *